(12) United States Patent
Weiβ

(10) Patent No.: US 7,742,838 B2
(45) Date of Patent: Jun. 22, 2010

(54) PROCESS AND DEVICE FOR CONTROLLING THE ROBOTAL DEVICE

(75) Inventor: Martin Weiβ, Margertshausen (DE)

(73) Assignee: Kuka Roboter GmbH (DE)

( * ) Notice: Subject to any disclaimer, the term of this patent is extended or adjusted under 35 U.S.C. 154(b) by 1086 days.

(21) Appl. No.: 11/170,495

(22) Filed: Jun. 29, 2005

(65) Prior Publication Data

US 2006/0004489 A1    Jan. 5, 2006

(30) Foreign Application Priority Data

Jun. 30, 2004    (DE) ........................ 10 2004 031 485

(51) Int. Cl.
   G05B 19/418    (2006.01)
(52) U.S. Cl. .................. 700/248; 700/245; 700/249; 700/251; 700/254; 700/262; 700/250
(58) Field of Classification Search ......... 700/245–264, 700/122, 100, 101, 102, 200, 201, 203, 216; 707/100, 500, 501.1; 318/468
   See application file for complete search history.

(56) References Cited

U.S. PATENT DOCUMENTS

| | | | |
|---|---|---|---|
| 5,506,787 | A | 4/1996 | Mühlfeld et al. |
| 6,526,332 | B2 * | 2/2003 | Sakamoto et al. ........... 700/259 |
| 6,760,648 | B2 * | 7/2004 | Sakamoto et al. ........... 700/245 |
| 6,816,753 | B2 * | 11/2004 | Sakamoto et al. ........... 700/245 |
| 2001/0037161 | A1 | 11/2001 | Hess et al. | |

FOREIGN PATENT DOCUMENTS

| | | |
|---|---|---|
| DE | 197 51 955 A1 | 6/1999 |
| EP | 0 657 043 B1 | 3/1997 |
| EP | 1 131 686 B1 | 4/2003 |

OTHER PUBLICATIONS

K.-H. Häfele, 1990, Industrieroboter off line programmieren, Rechnerunterstützte Konstruktion und Planung © Carl Hanswer Verlag, München 1990.

* cited by examiner

*Primary Examiner*—Khoi Tran
*Assistant Examiner*—Bhavesh V Amin
(74) *Attorney, Agent, or Firm*—Schiff Hardin LLP

(57) ABSTRACT

A process is provided for controlling a robotal device, such as a multiaxial industrial robot, by a control unit, with a control core for executing control processes for the robotal device. An interface function checks whether models and/or procedures optionally contained in the control core or additional models and/or transformation procedures and/or special algorithms of kinematic structures, which can be preset at the interface are used as model modules for motion-relevant variables of the robotal device. Special and third-party kinematics can thus also be operated with a control device suitable for executing the process without the control itself having to be modified.

8 Claims, 6 Drawing Sheets

PROCESS AND DEVICE FOR CONTROLLING THE ROBOTAL DEVICE

CROSS REFERENCE TO RELATED APPLICATIONS

This application claims the benefit of priority under 35 U.S.C. §119 of German Application DE 10 2004 031 485.3 filed Jun. 30, 2004, the entire contents of which are incorporated herein by reference.

FIELD OF THE INVENTION

The present invention pertains to a process and a device for controlling a robotal device, such as a multiaxial industrial robot, by means of a control means with a control core for carrying out control processes for the robotal device.

BACKGROUND OF THE INVENTION

Programmable, computer-aided, i.e., program-based control devices are nowadays usually used for controlling automated robotal devices, such as multiaxial industrial robots, portal robots (robots arranged and movable in a portal frame), SCARA robots (Selective Compliance Assembly Robot Arm—a robot selectively compensating in one plane, pivoted arm robot) or palletizing robots. Procedures for transforming kinematic and dynamic variables and system states of the robot for the purpose of use for different control tasks are a central part of such robot controls. This contains, for example, the position, orientation, velocity and acceleration (of the end effector or the axes), forces and torques in the transmission bearings, desired currents, the kinetic energy of the system, as well as mechanical stresses on the basis of known machine data. These data comprise, for example, geometry descriptions of the robotal device, such as lengths or angles, weights, centers of gravity of masses, and inertias as well as material parameters, such as rigidities, coefficients of friction and coefficients of expansion or the like. Other influential variables may be measured values supplied by sensors, such as temperature, dilatations and distortions.

The transformation of the variables and system states mentioned above as examples may take place in different directions, and a distinction is to be made additionally depending on whether actual or desired values are used as input variables. The following shall be mentioned here as examples:

The determination of the desired current for a robot axis from the desired position of that axis, taking into consideration the effect of the force of gravity, the desired velocity, the desired acceleration and the mass-moment of inertia, taking a desired temperature into consideration;

the determination of an estimated transmission torque from the actual velocity, the actual acceleration and the mass moment of inertia of the axis, taking an actual temperature into consideration; and the determination of the Cartesian path deviation from desired positions along axes and contouring errors, i.e., differences between the desired position and the actual position.

According to their basic design, the kinematic structures of robotal devices, the so-called "kinematics," are divided into different classes, the division being determined essentially by the number of axes (linear axes, axes of rotation, ball and socket joints, ... ), the connection of the axes by the components of the robot as well as the relative position of the axes in relation to one another. Whether closed structures ("loops") are formed or whether there is an open kinematic chain is a decisive aspect concerning the connection of the axes. The relative position of the axis is characterized essentially by orthogonality relationships and the intersections of the axes.

The term "class of kinematics" used means that only the above-mentioned embodiment and arrangement of the axes is decisive for the mathematical-physical treatment for the mathematical procedures mentioned, which are to take place in a corresponding control, whereas concrete geometric dimensions of, for example, robots of different sizes for different tasks emerge only as parameters in the corresponding description, without affecting the complexity of the processes per se.

Robot controls are currently typically able to operate robotal devices from only one or a few (fewer than 5) of such classes of kinematics.

The procedures necessary for the control of a robotal device, which were mentioned in the introduction, comprise essentially:

1. Transformations between axis angles and cartesian positions and orientations as well as between the derivations of these variables, i.e., conversion of axis velocities and accelerations into Cartesian velocities and velocities of the reorientation with the corresponding accelerations and vice versa.

These so-called forward and backward transformations are the basis for Cartesian processes; no cartesian path programming of the robot is possible without such procedures. A kinematic model of the robot, i.e., a geometric description without consideration of masses, inertias as well as the resulting forces and torques, is usually used here.

2. Determination of forces, torques and kinetic energy; no time-optimal motion programming and no related model based control is possible without such procedures.

The basis for the calculation is usually a rigid body model (see, among other things, Craig, Introduction to Robotics: Mechanics and Control, Addison Wesley, 1986), wherein friction can also be taken into account. In an expansion, elasticities can also be taken into account in the drivelines. Such a robot model is also called a dynamic model and is the basis for motion planning.

3. Calculation of functions of the kinematic and dynamic variables as auxiliary variables, e.g., of the inertia around a robot axis as an important variable for an axis control.

Variables such as the inertia vary in a robot as a function of other parameters, for example, the payload and axis angles of axes following in an kinematically open chain. Such function values are used, for example, for model-based control.

4. Calculation of partial derivations of the above-mentioned functions.

The partial derivations are needed for the conversion of variables given for given axes and in a cartesian path by means of the Jakobi matrix;

for the identification of system parameters, e.g., according to the least-squares principle. Such identification methods use partial derivations in the form of the Jakobi matrix. A sensitivity analysis of the parameters requires the Hesse matrix, i.e., the second-order partial derivations. However, such methods are usually used outside the robot control (cf. Kovacs, Computer-aided symbolic robot kinematics, Technische Universität Berlin, 1991).

As additional variables in the control loop.

5. Combinations of the procedures 1 through 3, e.g., kinematic calculation (Procedure 1), taking the deflection of the structure caused by the masses and the force of gravity into account (Procedure 2).

A robot control processes motion commands from different sources, such as program motions, manual displacing motions, and interrupt motions. Motion planning designated the part of a compiler or interpreter that calculates the geometric path of the tool on the basis of certain criteria from the motion commands of a robot programming language (which usually contains the type of point-to-point motion, linear motion, circular motion, spline motion, which are in turn characterized by the target of the motion), possibly including the course of the velocity on the path. This "plan" generated in advance for the course of the motion, is then "interpolated," i.e., points of support are calculated on the planned path—mostly at fixed time intervals—and are passed on—as axis angles—to the drives via the drive interface. For example, a checking is performed in the planning to determine whether the axis angles are within the permissible range (calling of the backward transformation) and/or a time-optimal path is planned (calling of the inverse dynamic model).

The corresponding axis angles are calculated in the interpolation for each cartesian point of support (calling of the backward transformation).

Depending on the current position, velocity, acceleration and load, pre-control torques are calculated in the drive interface. Different derivations are possibly calculated in the control unit.

While no model of the line is used in the classical cascade control of drives and partial derivations are therefore unnecessary, a nonlinear state space model d/dt x=f (x, u) is transformed into a linear model in modern nonlinear, model-based control processes, such as "feedback linearization" (A. Isidori, Non-linear Control Systems, Springer Verlag, 1989) or "backstepping" (Kokotovic: Non-linear and Adaptive Control Design, Wiley Interscience, 1995), and standard methods of linear control theory are then used for this linear model. The transformation contains derivations. This approach of the "Non-linear Model Predictive Control" solves an optimization problem over a certain time horizon in each control cycle (Jan Maciejowski: Predictive Control with Constraints, Prentice Hall, 2001). A zero position of the gradient, which is likewise characterized by partial derivations, is usually determined for the solution of minimization problems.

The above procedures can be performed mathematically with the use of certain standard algorithms of an analytical and/or numeric nature. The following designations will be used below for the mathematical formulation of the procedures:

n number of axes or joints $\theta_i$, i=1, ..., n joint coordinates (angle in case of hinges, lengths in case of rectilinear sliding pairs; scalar)

(x, y, z, a, b, c, S) cartesian position (S: configuration information; see below).

The above-mentioned (transformation) procedures 1 through 5 can be made available in different ways due to the internal structure of the particular robot control used, because they are not set unambiguously in terms of their input and output variables. This shall be shown below based on the example of the backward calculation in case of a kinematics with open chain, i.e., the determination of joint coordinates in case of a given cartesian position of the robot tool (end effector):

Backward calculation in case of a six-armed collapsible robot, i.e., determination of axis angles for a given cartesian position: (x, y, z, a, b, c, S)→($\theta_1$, ..., $\theta_m$).

The input variables x, y, z, a, b, c describe the desired position and desired orientation here, for example, via roll-pitch-yaw angles, whereas the additional variable S (typically an integer interpreted as a bit sequence) contains a piece of information that is to be selected from among the different solutions of the calculation. It is implicitly assumed here that an unambiguous solution exists. The additional pieces of information can be preset, for example, in the form of permissible angle ranges.

Backward calculation with quantitative result:

$$(x, y, z, a, b, c) \rightarrow \{N, \theta_{i,j}\}, j=1, \ldots, N.$$

The number of possible solutions N is provided, together with the particular solutions as a result, by this type of backward calculation. The additional information S is not necessary here. It is implicitly assumed that a finite number of solutions exists.

Backward calculation with a result as close to a given position as possible: (x, y, z, a, b, c, $\phi_i$)→($\theta_1$, ..., $\theta_n$).

The solution whose euclidean distance becomes minimal, i.e., $\|\phi_i-\theta_i\|$=min, is determined for a given cartesian position (x, y, z, a, b, c) and given axis angles ($\phi_i$).

In case of processes and devices of the type described in the introduction, which are known in advance, one or more of these different variants are selected and implemented by the manufacturer of the control as a preferred procedure (as preferred procedures). Kinematic data (lengths, angles), dynamic data (masses, inertias) and optionally other physical parameters are stored as parameters for the procedures 1 through 5 in corresponding machine descriptions that belong to them.

A fundamental restriction arises during the implementation for mathematical reasons: It is not possible to specify a general mathematical process for determining all procedures 1 through 5 from a given geometric and dynamic description of a robot. Some fundamental mathematical problems in this connection are:

The backward calculation in case of kinematics with open chain can be reduced to the determination of the zero positions of polynomials via the so-called tan/2 substitution, but no analytical solution exists for general polynomials beginning from the fifth degree (van der Waerden, Algebra I/II, Springer, 1993). Thus, no analytical solution of the backward calculation is possible for any desired oblique positions of axes and for any desired distance between axes. In addition, the effort needed for the calculation also increases greatly for the analytical solution—if any such solution exists—in case of the use of the most modern methods (Kovacs, elsewhere). An analytical solution is to be preferred to a numerical one, because numerical methods are, for example, incapable of determining the number of possible solutions.

The forward calculation is trivial in case of kinematics with open chain, because only matrices must be multiplied here (Craig, elsewhere; Paul, Robot Manipulators, MIT Press, 1983). No analytical forward calculation is known, as a rule, in case of kinematics with kinematic loops, e.g., hexapods, so that what was said above in connection with the backward calculation correspondingly applies here. The backward calculation in case of loop kinematics can, by contrast, be often determined in a simple manner analytically (Möller, A Method for the Automatic Analysis of Multi-Loop Spatial Mechanisms, Dissertation, Universität Stuttgart, 1992).

The calculation of the "inverse dynamics" is possible in case of open kinematic chains via the so-called Euler-Newton algorithm, if the axis coordinates are known. As in the case of the backward calculation of kinematics with open chain, there is no general solution in case of closed kinematic chains.

If no analytical calculation method is known in case of a certain procedure, there is usually no possibility for analytical calculation for the partial derivatives, either (see above).

Nevertheless, the manufacturer of a control strives to be able to operate the largest possible number of types of kinematics with a given control. This is especially true if this manufacturer offers both controls and kinematics. On the other hand, a control shall also be able to be operated with kinematics of third-party manufacturers, who do not offer controls of their own themselves. A manufacturer of controls had two possibilities for this up to now: On the one hand, the implementation of all procedures 1 through 5 for a limited number of kinematics, and, on the other hand, the use of (iterative) numeric methods combined with analytical solutions. The fact that all procedures 1 through 5 must be implemented for each kinematic, so that the scope of the control also grows with the number of the kinematics to be supported at will, besides the effort needed for the development and care, is to be considered to be disadvantageous here, in particular. Consequently, if newly developed kinematics or third-party kinematics of another manufacturer are to be operated with a given control, this is possible only if the corresponding kinematics falls within one of the already implemented classes of kinematics or can be calculated with the procedures of these kinematics.

The use of (iterative) numerical methods combined with analytical solutions shall be explained below based on the interaction of forward and backward transformations in case of a kinematic with open chain. Only a matrix multiplication is necessary for the forward calculation, and the matrix entries are composed of the joint variables and kinematic descriptions (for example, the Denavit-Hartenberg parameters) as well as of the coordinate systems for the tool, the robot base, etc. The position of the end effector and the orientation P of the end effector are given mathematically as a function of the axis variable $\theta_i$: $P=f(\theta_i)$.

The necessary parameters can be stored in a data set for the machine description. According to the statements made above, the back transformation cannot be solved, in general, analytically, so that a method for the numerical solution of systems of equations of the above form is used, instead, for a given P (Münch, Universal coordinate transformation for industrial robots, www.maschinenbau.hs-magdeburg.de/personal/bargfrede/-fue_robotics.html).

What is to be considered to be disadvantageous in this procedure is, in particular, the fact that it is not possible to implement the procedures 1 through 5 in a generally valid form, and especially the lack of ambiguity of the solution, as well as the convergence characteristic, which is critical for real-time applications, and the often insufficient accuracy argue against the numerical methods, which are used by necessity.

A manufacturer of kinematics nowadays depends on software development cycles of the control manufacturer: Even if the manufacturer of the kinematics is able to implement the procedures 1 through 5 by calculation, he has no possibility of utilizing these with an existing control software, Moreover, the manufacturer of the kinematics usually wishes to develop the procedures 1 through 5 himself in order not to be forced to have to disclose operational know-how to the manufacturer of the control. However, this is not possible in case of the processes and the devices of the type mentioned in the introduction, because the manufacturer of the control would conversely have to disclose detail information concerning the control to the manufacturer of the kinematics.

SUMMARY OF THE INVENTION

The basic object of the present invention is to improve a process and a device of the type mentioned in the introduction, while avoiding the problems mentioned, such that compatibility can be achieved if needed, i.e., especially in case of the use of the control with a new kinematics not provided originally, without changing the control itself. Furthermore, companies offering third-party kinematics shall be enabled to use the control of a control manufacturer without the help of that manufacturer in order to thus become independent from external development cycles.

The object is accomplished in a process of the type described in the introduction by checking by an interface function whether models and/or procedures, which are optionally contained in the control core, or additional models and/or transformation procedures and/or special algorithms of kinematic structures, which can be preset at the interface, are used as model modules for motion-relevant variables of the robotal device. In case of a device of the type mentioned in the introduction, provisions are made for accomplishing the object for the device to have an interface at which additional models and/or transformation procedures and/or special algorithms of kinematic structures can be preset as model modules for motion-relevant variables of the robotal device in addition to models and/or transformation procedures optionally contained in the control core.

The essence of the solution according to the present invention is consequently a modularization of the control architecture in order to logically separate the transformation procedures 1 through 5 mentioned in the introduction from the rest of the control and thus to create a mechanism that permits an external, kinematics-specific implementation of part or all of the procedures 1 through 5, optionally together with corresponding models and/or special algorithms in a so-called "model module." This procedure is based on the fact that such procedures can be considered to be mathematical functions without a direct dependence on the rest of the control; they are considered according to the present invention to be a pure interface specification in the control (preset input and output variables), which can be combined with the rest of the control functions: The internal processes of these procedures do not have to be known for the part of a robot control that goes beyond the aforementioned procedures 1 through 5. Contrary to other functionalities of a robot control, which are characterized by quasi-simultaneous performance and interaction with other control components (so-called multi-tasking), the procedures can be considered to be functions in the strictly mathematical sense, i.e., certain input variables are treated according to a defined algorithm and yield certain result variables. Consequently, the procedures can be considered to be a kind of "black box," for which only an interface must be defined for the exchange of the input and output variables.

The present invention correspondingly makes provisions for inserting in the control an interface, preferably of a program-based design, which is connected, in terms of connection in the program structure of procedures 1 through 5 that are separated from the rest of the control, to the rest of the control. Some or all of these procedures can thus be solved numerically and/or analytically with optimal use of the standard algorithm present in the control core, and kinematics-specific methods are connected to an existing control core, for example, by a compiler or connecting mechanism usually present in conventional robot controls in the course of an especially preferred embodiment of the process according to the present invention, by the model modules, which may be present as a data file in an external memory means, optionally an erasable read-only memory (ROM, EPROM). It is possible now, in principle, to implement the procedures 1 through 5 for the kinematics, which are provided for a control as included procedures, either internally (permanently), or provisions may be made alternatively for connecting these procedures, in principle, via external model modules as well.

The model module or model modules may contain essentially executable object code or, as an alternative, compilable program code. Both dynamic and static links may be considered for use for connecting to the control core.

According to a variant of the process according to the present invention, provisions are made for the compatibility of the standard algorithms present in the control core and the kinematic structure indicated in the model module to be checked. A device according to the present invention preferably has for this purpose a checking means for checking the compatibility of the standard algorithms and of a kinematic structure indicated in the model module. The checking means may be located, as an alternative, either in the control core or in the model module.

Other properties and advantages of the present invention appear from the following description of exemplary embodiments on the basis of the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
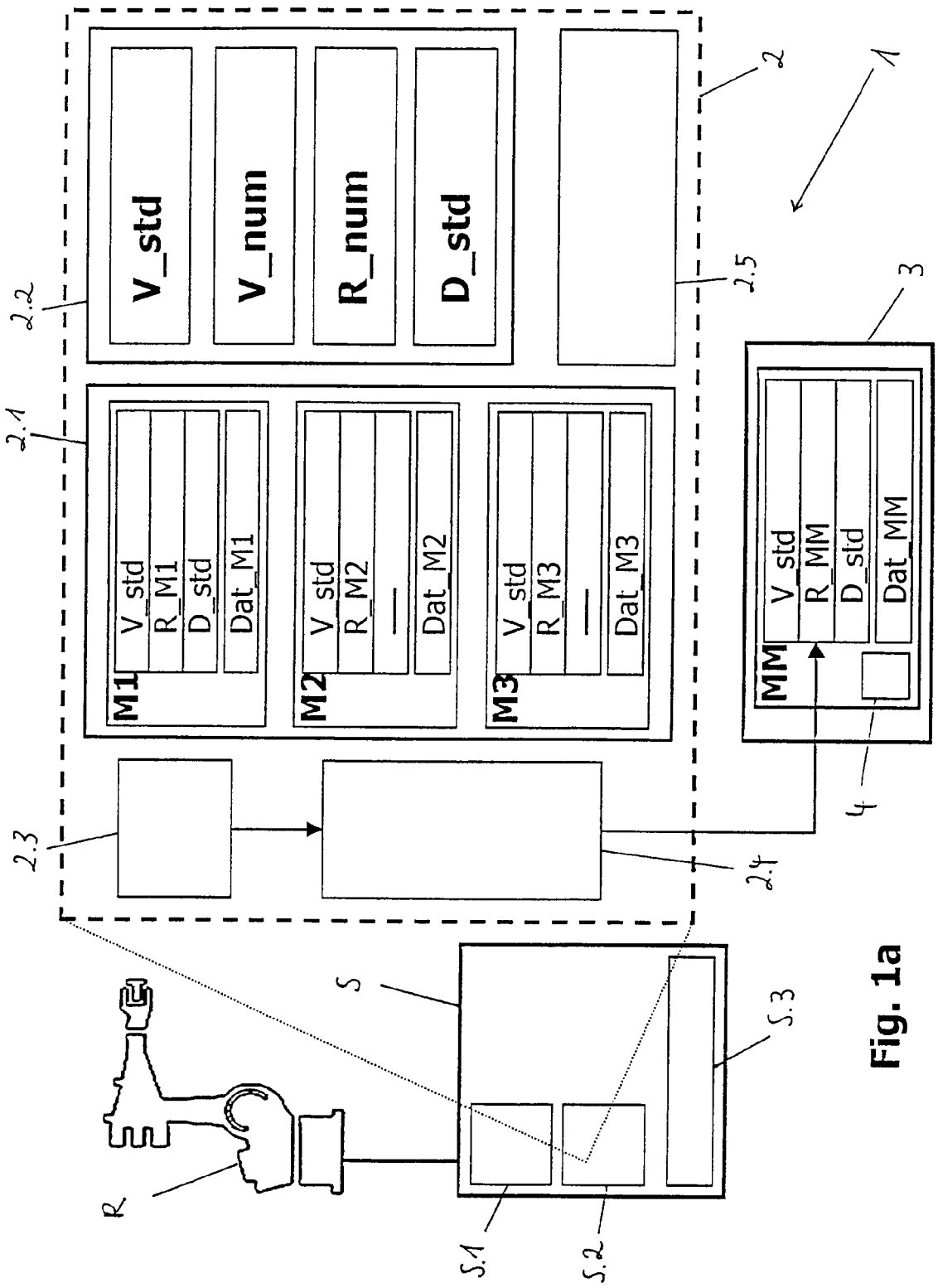
FIG. 1a is a block diagram of the structure of a robot control according to the present invention.

Referring to the drawings in particular, FIG. 1a shows a typical multiaxial industrial robot R along with the corresponding control unit or control means 5, in which a processor unit S.1, a working memory S.2 as well as a mass storage unit S.3 are also shown as components of such a control means 5, which are regularly present. Furthermore, FIG. 1a shows, on the basis of a block diagram, a device 1 according to the present invention for controlling a robotal device, such as the multiaxial industrial robot R, with a set of kinematic models M1-M3 in the core 2 of the robot control as well as with a model module MM with the backward calculation called.

First, the device 1 has a control core 2, which is preferably set up in a programmed form, i.e., on the basis of suitable software on a control computer (the control unit S.1) for the robotal device R. This regularly happens by loading a corresponding software application into the working memory S.2 of the control computer.

The control core 2 comprises memory areas 2.1, 2.2, in which kinematic models M1-M3 are stored for the classes of robotal devices that can be operated with the device 1 according to the present invention or with the control core 2 and standard algorithms V_std, V_num, R_num, D_std for the mathematical implementation of the corresponding procedures (see above).

The kinematic models M1-M3 may be, for example, models for a five-axis (five articulations of connected arms) and six-axis (6 articulations of arms) multi-axial industrial robot (M1), a SCARA robot (M2) and a portal robot (M3). Each of the models M1-M3 contains suitable procedures each for forward calculation (V_ . . . ), backward calculation (R_ . . . ), optionally a dynamic model (D_ . . . ) as well as machine data (Dat_ . . . ), either in the form of a separate implementation, for example, within the memory area 2.1, or in the form of an address reference to the corresponding standard algorithms ( . . . _std) within the memory area 2.2. For example, reference is made to the standard algorithm V_std and R_std for the model M1 concerning the forward and backward calculation. No dynamic model is provided for the models M2, M3.

Furthermore, the control core 2 comprises a planning and calling instance 2.3 for control tasks to be performed as well as a (logic) interface 2.4, which represents the actual core of the present invention, which will be discussed in detail below.

The control core 2 additionally also contains a selection and checking means 2.5, whose function will also be discussed. The selection and checking means 2.5 may also have, as an alternative, a two-part design and/or be contained outside the control core 2 (in the model module MM; see below).

Separately from the above-described control core 2, the device 1 according to the present invention has an external memory means 3, in which a model module MM structured essentially analogously to the already described kinematic models M1-M3 is stored in the subject of FIG. 1a. The memory means 3 is preferably a ROM memory or an EPROM memory or a data file on a hard drive, diskette, etc.

Special kinematics, for the operation of which the control core 2 as such is not intended, for example, because a corresponding kinematic was not (yet) known to the manufacturer of the control, can be represented according to the present invention by means of the model module MM. The model module MM is preferably connected according to the present invention to the control core 2 by a linker (not shown), which is regularly present in the control core 2 and may contain—just as the kinematic models M1-M3 contained in the control core—separate transformation procedures ( . . . _MM) and (address) references to standard algorithms ( . . . _std) in the control core 2. The model module MM additionally comprises a globally defined software object 4, which will be discussed later.

For reasons of clarity, only forward and backward calculation (procedure 1) and the dynamic model (procedure 2) are represented from among the procedures 1 through 5 mentioned in the introduction to the specification for both the models M1-M3 and the model module MM.

A robot kinematics in the model module MM can be described in different ways. Possible standard implementations as well as the effects of these implementations on the implementation of the transformation procedures mentioned in the introduction and of the (logic) interface 2.4 according to the present invention will be described below. A corresponding assigned physical interface for docking the memory means 3 with the model module MM to the (physical) control is, of course, present as well, for example, in the form of a CD or DVD-ROM drive or the like, but it is not shown in the logic mode of representation selected here.

An open kinematic chain can be described, for example, by the specification of the Denavit-Hartenberg parameters and of the axis type (linear axis/rotatory axis) in an ASCII data file. The corresponding data, which are stored according to the present invention as machine data Dat_MM, are correspondingly (Craig, elsewhere; Paul, elsewhere):

$$dh1=(a\ 1000\ cm,\ \alpha\ 90°,\ d\ 20\ cm,\ \theta\ 0°)$$

$$dh2=(a\ -500\ cm,\ \alpha\ -90°,\ d\ 100\ cm,\ \theta\ 0°).$$

Standard algorithms, such as the forward calculation for open kinematic chains V_std of an industrial robot with hinges, are implemented in the control core 2, for example, in the form of simple matrix multiplications:

$$\text{Tool}=A_1\ (RotZ\ (\theta_1)\ A_2\ RotZ\ (\theta_2)\ A_3\ RotZ\ (\theta_3)\ldots A_n RotZ\ (\theta_n)A_{n+1}.$$

Here, $A_i$ designates the constant matrices for the description of the geometry of individual components of the kinematic chain and RotZ $(\theta_i)$ designates a rotation about the z axis of the particular joint (if only axes of rotation are present).

As an alternative, the design of a robot can be given in the form of a graphic representation, whose nodes correspond to the components of the robot. Moreover, properties, such as extension, mass, etc., are assigned to the individual components. As an alternative, a description of the kinematics can be done away with altogether if the parameters of the model description, such as arm lengths or the like, are implemented as fixed constants in the control software, i.e., in the control core 2.

The interface 2.4 shown in FIG. 1a for connecting model modules MM is a program-based means in the course of a preferred embodiment of the present invention and is designed in a common programming language, such as C++. The control manufacturer makes available for an interface description in the form of a so-called header data file (data file extension: ".h;" name being used here: "ModellInterface.h"). This data file contains a description of the data file types and function signatures (arguments, parameters and results) as well as the names of address variables present in the control core 2, which are used to connect the interface 2.4 according to the present invention. "Connecting" is defined as the connection of an object code generated by the compiler with libraries or the like to generate a program that can be run (it is also called linking).

The following program code shows a typical example of a header data file with support of forward and backward transformation:

```
const int MaxAxis = 12;
struct DenavitHartenberg {
    double a, alpha, d, theta;
};
struct AxisConfiguration {
    double axis [MaxAxis]
}
```

-continued

```
struct Frame {
    double x, y, z, a, b, c;
};
typedef int StatusType;
typedef int (*ForwardTransformationType) (AxisConfi-
    guration &Axis, Frame &CartesianPosition,
    StatusType Status);
typedef int (*BackwardTransformationType) (const
    Frame &CartesianPosition, const StatusType Status,
    AxisConfiguration &Axis);
extern BackwardTransformation AddressForwardTransfor-
    mation;
extern ForwardTransformation AddressBackwardTrans-
    formation;
extern int StandardForwardTransformation (int NumAxis,
    AxisConfiguration &Angles, const DenavitHarten-
    berg DHParameter[], Frame &CartesianPosition,
    StatusType & Status);
```

Furthermore, auxiliary procedures for calling the transformation procedures are implemented in the control core 2 of the device 1 according to the present invention. In addition, variables with addresses, by means of which the interface 2.4 is able to call the procedures necessary for a certain model M1-M3, are contained there. These are "AddressForwardTransformation" and "AddressBackwardTransformation" for the calling of the forward and backward transformations in the above-mentioned example code. A possible interface code with integration of the above-mentioned header data file reads as follows:

```
#include "ModellInterface.h"
extern ForwardTransformation AddressForwardTransforma-
tion;
extern BackwardTransformation AddressBackwardTransforma-
tion;
int CallBackwardTransformation (const Frame
    &CartesianPosition, const StatusType Status, AxisCon-
    figuration &Axis)
{
    if (UseModellInterface)
    {
    return (AddressBackwardTransformation) (Cartesian-
    Position, Status, Axis)
    }
    else
    {
        switch (ModelType)
        {
            case Standard6Axis:
                return BackwardTransformationStan-
                    dard6Axis (CartesianPosition,
                    Status, Axis);
            break;
            case Scara:
                return BackwardTransformationScara
                    (CartesianPosition, Status, Axis);
            break;
            case Portal:
                return BackwardTransformationPortal
                    (CartesianPosition, Status, Axis);
            break;
        }
    }
}
int StandardForwardTransformation (int NumAxis, AxisCon-
figuration &Angles, const DenavitHartenberg DHParame-
ter], Frame &CartesianPosition, StatusType & Status)
{
    Matrix44 Position; // frame as 4 × 4 matrix
    // Position = identity matrix
    for (int Axis = 0; Axis < NumAxis; ++Axis)
    {
```

```
            // convert DHParameter[Axis] to matrix M;
            // build variable Z matrix depending on An-
               gles[Axis]
               Position = Position * M * Z;
            // convert Position to Frame CartesianPosition
            Frame = ... ;
    }
```

The special procedures tailored to the underlying kinematics are implemented in the model module MM (FIG. 1a: R_MM). Added to this are, as was stated above, the corresponding machine data Dat_MM as well as a global software object 4, i.e., an object that is available not only within a subroutine, whose instructions are executed during the initialization of the model module MM (contains constructions and general initialization commands).

Figure 1B:
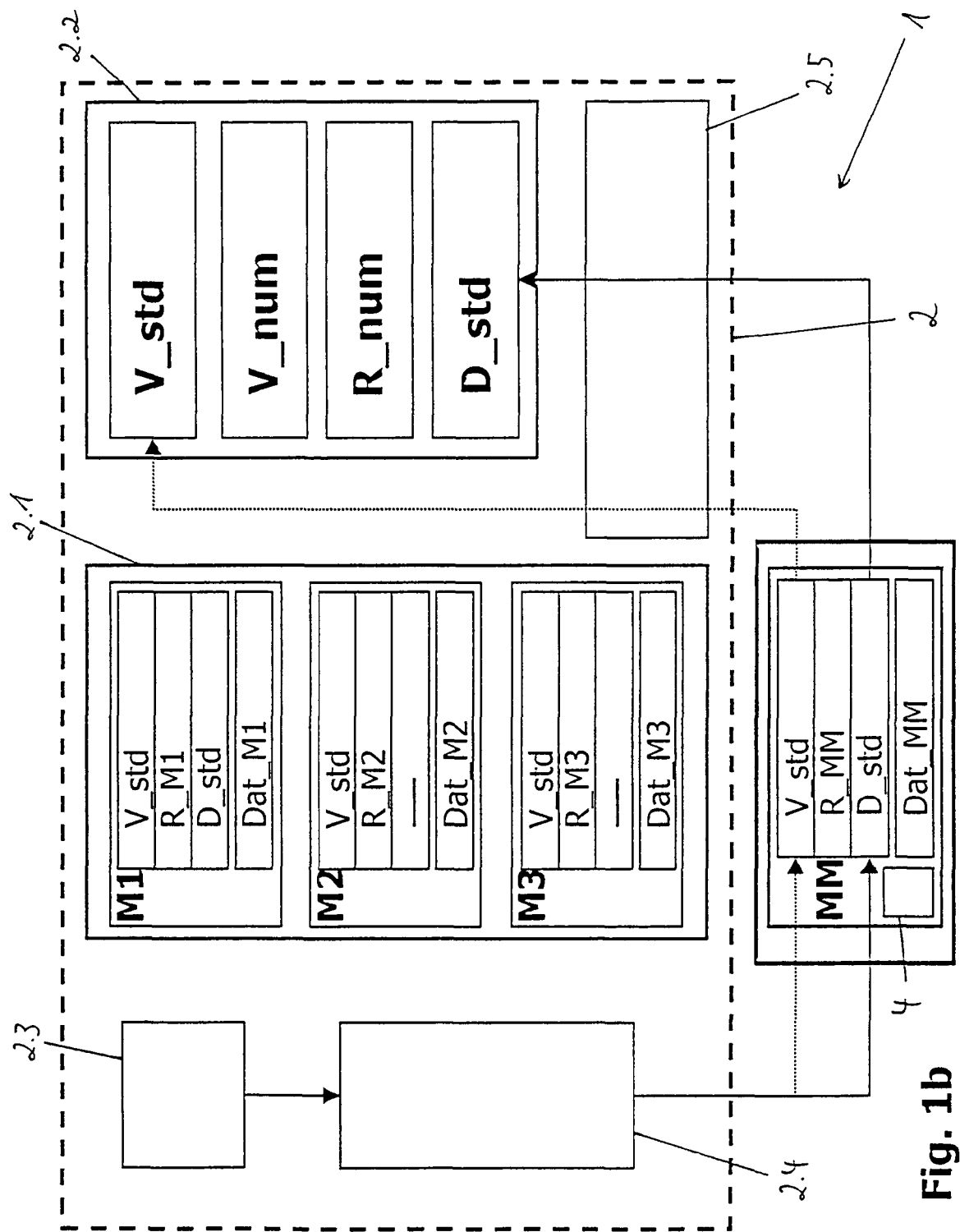
FIG. 1b is a view corresponding to FIG. 1a during the calling of the forward calculation implemented in the control system and the dynamic model via the model module as well as a backward calculation implemented in the model module.

In the following example, the forward calculation calls the standard algorithm from the control core 2; this is indicated by broken lines in FIG. 1b. The backward calculation is implemented separately in the model module MM, which is only indicated in the program code and is represented graphically in FIG. 1a by means of the solid line from the interface 2.4 to procedure R_MM of the model module MM. Machine data Dat_MM are stored in the model module MM as a list of Denavit-Hartenberg parameters. The software object "SpecialModel" assigns in its constructor the addresses of the functions to the variables declared in the header data file, which correspond to the procedures of the model module (with the special model, "SpecialModel"):

```
#include ":ModelInterface.h"
const int NumAxisSpecial = 6;
DenavitHartenberg DHParameterSpecial = {
    {10, 20, 30, 0},
    {20, 30, 40, 0},
    ...
}
int ForwardTransformationSpecial (AxisConfiguration
    &Axis, const Frame &CartesianPosition, const StatusType
    Status)
{
    StandardForwardTransformation (NumAxisSpecial,
    Angles, DHParameterSpecial, CartesianPosition,
    Status);
}
int BackwardTransformation (const Frame &CartesianPosi-
    tion, const StatusType Status, AxisConfiguration &Axis)
{
    //;
}
class InitSpecialModell {
Public:
    InitSpecialModell ( ) {
        AddressForwardTranformation = ForwardTransforma-
            tionSpecial;
        AddressBackwardTransformation = BackwardTransfor-
            mationSpecial;
    }
}
InitSpecialModell SpecialModell;
```

The interface 2.4 can be embodied according to the present invention in different embodiments, which all depend on a concrete embodiment of the control core 2.

Variant 1

This variant pertains to the implementation of an interface 2.4 for the dynamic or static linking of the model module MM to the control core 2. The algorithms for the procedures 1 through 5 are implemented here as functions in a high level programming language (assembler), after which the instructions are possibly translated by a compiler or assembler into a machine-readable object format (object code). The control core 2 then checks, at the start-up of the control system, for example, in the planning and calling instance 2.3, which is responsible for the running of a control program, whether such an object data file with a model module is present, and optionally connects this to the control core. The model module must communicate in this connection to the control core the addresses of the functions necessary for the execution of its procedures, which may be either in the model module MM itself or in the control core, and an additional checking of the compatibility of standard algorithms of the control core 2 and requirements of the model module MM is performed according to the present invention by the checking means 2.5, for example, concerning the number of necessary or transferred parameters and/or of an output format. In addition, a corresponding message can be sent in case of errors to the control core.

A preferred embodiment of the present invention, as it was explained above on the basis of FIG. 1a for an introduction, correspondingly comprises two independent components, namely, the control core 2 and at least one model module MM. The control core usually contains here a mechanism for dynamically connecting (linking) tables with symbolic names, so-called symbol tables, which is usually made already available by the operating system, e.g., by the real-time operating system VxWorks usually present in robot controls. Furthermore, both the control core 2 and the model module MM contain, on the one hand, executable machine commands in the form of functions or procedures, which are formed especially in the area of the operating system VxWorks by the translation of C or C++ programs. On the other hand, there exists a symbol table, which indicates the entry addresses for the functions and procedures and the location of variables in the memory. This is a common form of a symbol table, which is likewise made available by the real-time operating system VxWorks.

Within the framework of the present invention, the symbol table of the control core 2 contains especially an address variable of the form of "AdresseFunktionX" (see above program code). "FunktionX" stands here for one of the procedures 1 through 5, i.e., there exists a separate address variable for each of the procedures and its special expression with the corresponding possible parameters and return values. These are the designations "AddressForwardTransformation" and "AddressBackwardTransformation" in the above example. These address variables are globally known within the control program and contain the memory address of the calculation instruction for designating "FunktionX" in the memory.

Furthermore, the control core 2 contains, among other things, a routine with the designation "StandardFunktionX," in the example "StandardForwardTransformation." This is a standard implementation (located in the control code 2) of the corresponding procedure, and it is possible to address a certain procedure from among the plurality of procedures present in the control core 2 on the basis of an additional variable for characterizing the type of kinematics. It is also possible that the standard implementation is present in the control core 2 only formally, so that an error message is generated when it is called. It can thus be effectively forced that the corresponding procedure will be either implemented or it will never be used. As an alternative, it is also possible that no standard implementation is present at all, as in the above example in the case of "StandardBackwardTransformation."

The model module MM contains, in turn, executable machine commands for functions of the type of "ModulfunktionX," the "ForwardTransformationSpecial" and "BackwardTransformationSpecial" procedures in the example. Furthermore, the model module comprises an initialization routine in the form of executable machine commands, which are called by the dynamic linker of the control core 2 after the connection. As is shown in the above program sections, a global object ("SpecialModell"), whose constructor is called after the link, before any function—typically "main( )" in a program comprising only one module—is called, is prepared in the programming language C++ within the framework of a preferred embodiment of the present invention. No function is typically called after the reloading at all in case of a reloaded module, i.e., only constructors of global objects are called. As a result, it is ensured in the process being described that before a function is called from the model module, all variables will already have their correct values. Since the name "Adresse-FunktionX" is known to the manufacturer of the model module, an instruction, which assigns the memory address of the "ModulfunktionX" to the "Adresse-FunktionX" variable, can be preset in the initialization routine.

During the initialization of the overall system, it is first checked on the basis of a "UseModelInterface" variable whether a (transformation) procedure present in the control code shall be used or whether an external procedure in a model module is preset at the interface. If the interface is not to be used, the address of a standard procedure present in the control core is entered in the "AdresseFunktionX" variable or is branched within the framework of a case distinction directly into a case in which the standard procedures implemented in the control core 2 are called (cf. FIG. 1*c*).

If the model module MM is to be used via the interface 2.4, it is loaded into the memory of the control computer (not shown) by means of the dynamic connecting mechanism and connected to the control core 2. It is characteristic of the dynamic connecting mechanism that the symbolic names in the loaded model module MM are replaced, for example, by the memory address. As a result, the model module MM can access the "AdresseFunktion)X" variable of the control core 2. This makes it possible for the model module to pass on information on the jointly used name "AdresseFunktionX" set in advance to the control core 2. After loading and connecting the model module MM, the initialization routine (see above) is called, as a result of which the memory address of the "ModulfunktionX" procedure provided by means of the interface is stored in the "AdresseFunktionX" variable. In the above examples, these are the AddressForwardTransformation=TransformationSpecial; AddressForwardTransfomation=BackwardTransformation Special" assignments. Furthermore, the model parameters are optionally loaded as machine data from description data files or tables (Dat_MM) in the initialization routine.

After the initialization has been performed (cf FIGS. 3*a*, 3*b*) of the control core 2, the "AddressFunktionX" variable consequently contains:

The memory address of the standard algorithm "StandardfunktionX" if the interface is not used to connect a model module;

the memory address of the "ModulfunktionX" function if the interface is used to connect a model module.

The above-described process is called "dynamic connecting" because it runs each time the control is started. As an alternative, the result of a connecting process as described above can be stored (statically) and can be subsequently defined as a new control core. This is called a so-called "static connecting."

After the above, the calculation of the forward transformation is performed, with the model interface 2.4 activated, in the following manner (cf FIG. 1*b*, FIG. 2; always as broken lines): To evaluate "FunktionX," the control core 2 executes the commands that are stored at the memory address entered in "AdresseFunktionX." If the interface 2.4 is not used, i.e., if no model module MM is connected to the control core 2, this address stored in the "AdresseFunktion" corresponds to the memory address of the standard function "StandardfunktionX." Otherwise, it corresponds to the memory address of the "ModelfunktionX."

Figure 3A:
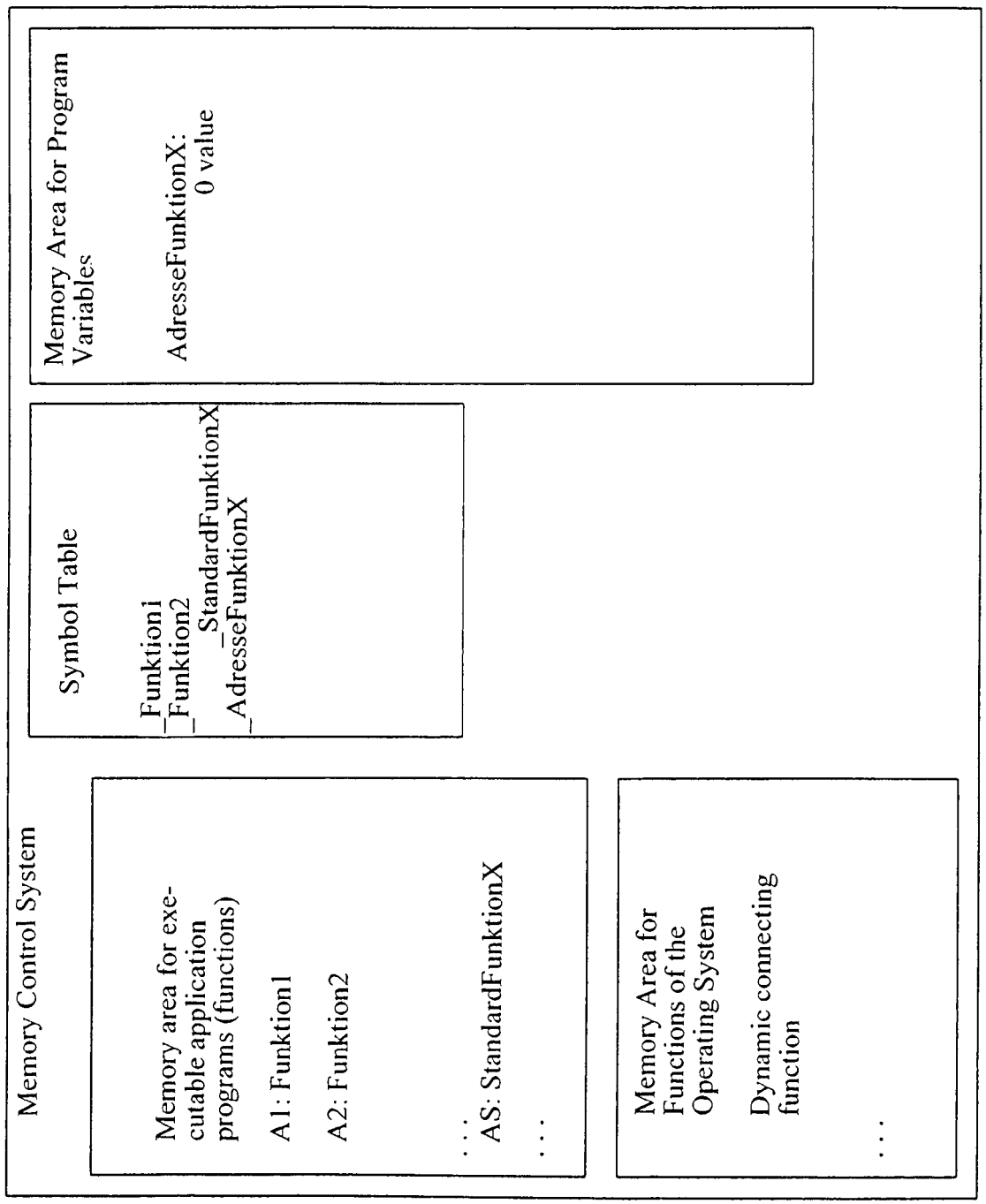
FIG. 3a is a schematic view of the memory structure of a variant of the robot control according to the present invention with an interface for the dynamic or static linking of a model module to the control core before the model module has been connected.
Figure 3B:
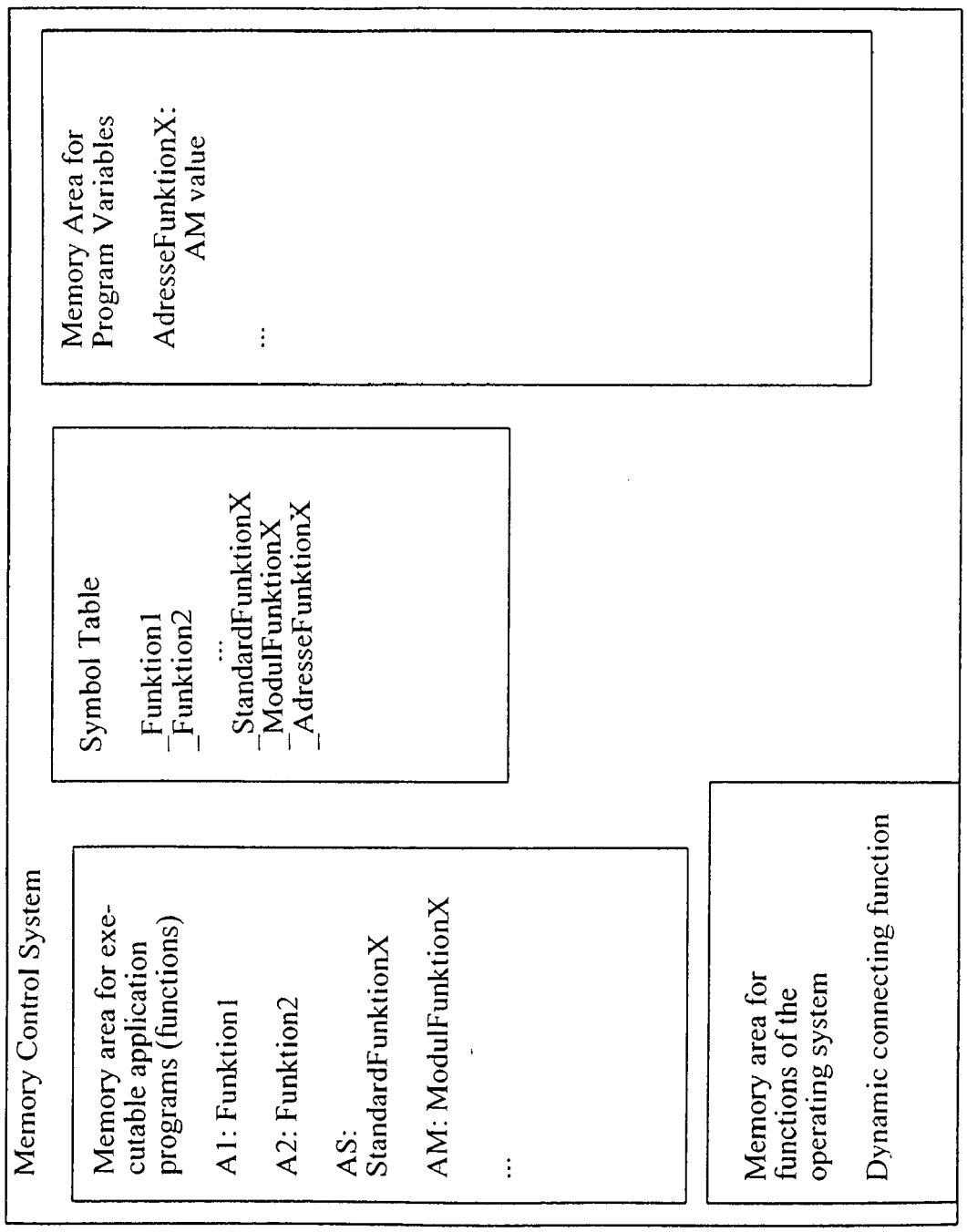
FIG. 3b is a schematic view of the memory structure according to FIG. 3a after the model module has been connected.

The above-described processes are shown in detail in FIGS. 3*a*, 3*b*, which schematically show the memory structure of a variant of the robot control according to the present invention with an interface for the dynamic or static linking of a model module to the control core before and after a model module is connected.

Programming languages other than C or C++ and other operating systems offer possibly slightly modified mechanisms in order to integrate additional functions analogously to the above. The programming languages LISP or SmallTalk, where the former is popular for applications in robots in the area of artificial intelligence, are not usually compiled, so that interpretable instructions can be added to the system as simple text data files at any time. It is decisive within the framework of the present invention that a common designator, here "AdresseFunktionX," is used in both the control core and the model module.

Figure 1C:
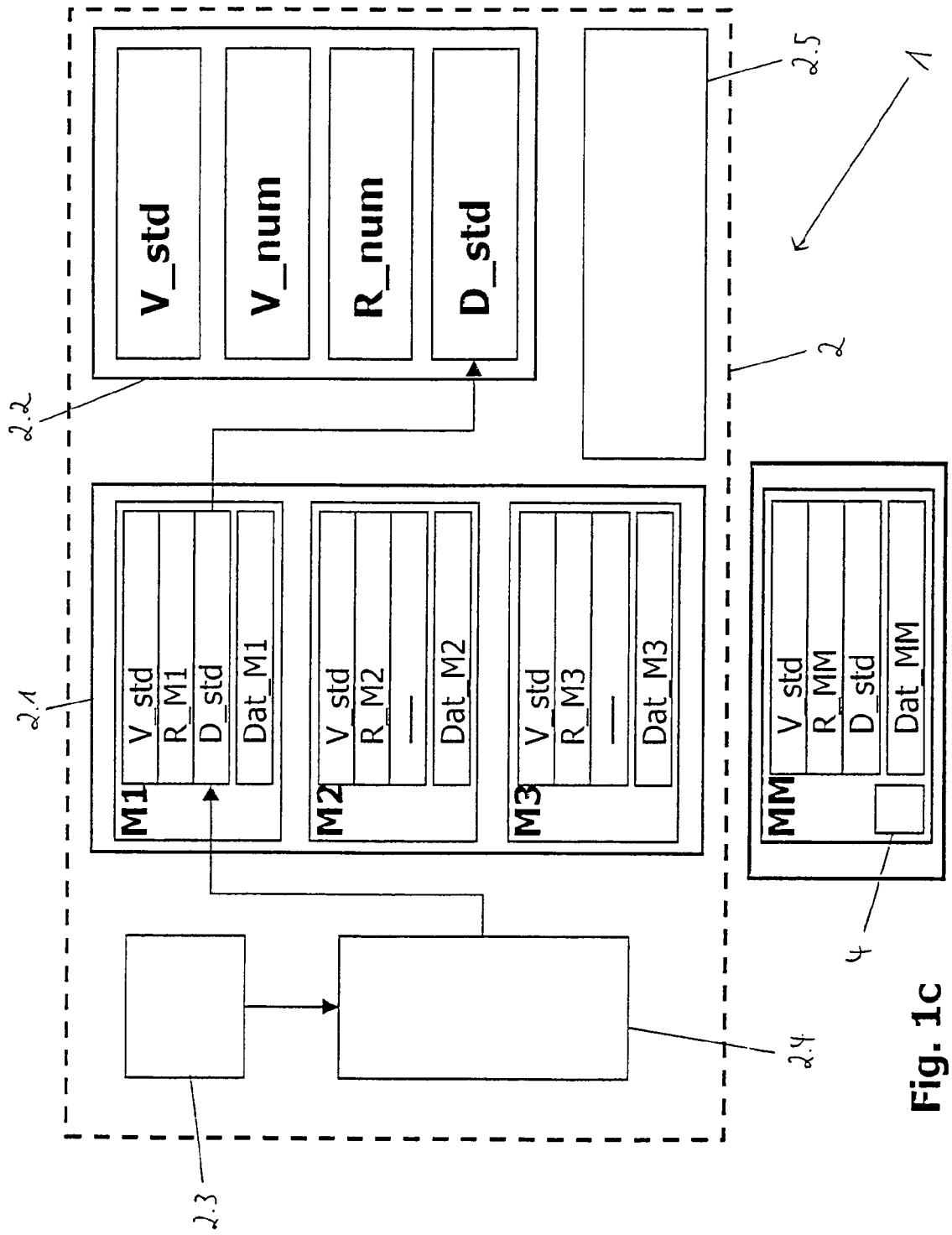
FIG. 1c is a view corresponding to the above figures during the evaluation of the dynamic model for a kinematic model present in the core of the control.

The device according to the present invention according to FIG. 1*c* differs from the embodiments explained up to now in that no model module MM is configured, i.e., the model module MM is not connected to the control core 2. The interface 2.4 calls, according to FIG. 1*c*, the dynamic model D_std for a kinematic model M1, which is contained in the control core 2 and uses a standard algorithm D_std of the control core 2.

Figure 2:
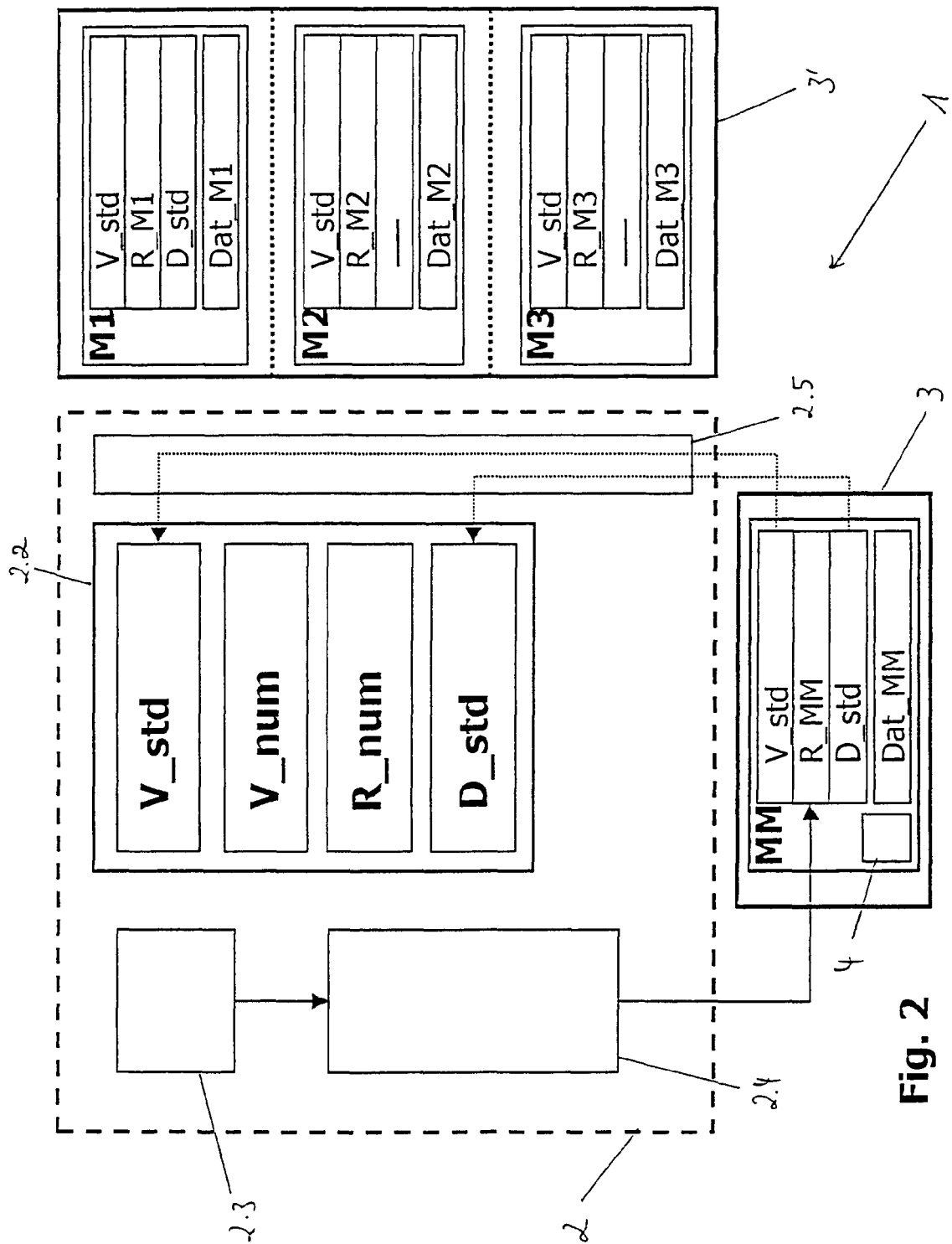
FIG. 2 is the structure of a robot control according to the present invention on the basis of a block diagram.

FIG. 2 shows the structure of a robot control according to the present invention with the interface 2.4 according to the present invention, in which all kinematic models are implemented in the form of model modules, i.e., the models M1-M3 are also arranged externally in relation to the control core 2, which makes available only standard algorithms V_std, V_num, R_num, D_std as building blocks for the (external) kinematic models. The solid arrow shows the calling for the backward transformation, and the broken lines indicate the calls for the other procedures (forward calculation and dynamic model). Special kinematics (third-party kinematics; model module MM) and standard kinematics (modules M1-M3) are treated fully equally in this embodiment. Like the model module MM, the modules M1-M3 also contain, according to the embodiment shown in FIG. 2, a global object 4, but this object is not shown explicitly for reasons of clarity. The modules M1-M3 can be made available by means of another external memory means 3' individually or together with corresponding logic separation (bold broken lines in FIG. 2). Contrary to Variant 1, where the executable object code was already generated from the source code by the manufacturer of the control before the control was shipped, a form of source text is considered to be the model module in Variant 2, and it is translated into executable object code only at the time of the reloading of the module, and it is interpreted each time when a function of the model module is called. A combination of a code to be interpreted or compiled and a textual description of the machine data of a robot kinematics can also be considered to be a source text.

Variant 2

As an alternative, the description of the procedures 1 through 5 can be performed by mathematical formulas and equations, which are evaluated by an interpreter or compiler in the control core 2. This requires the implementation of an interpreter or compiler for the evaluation of mathematical formulas or equations including variables which describe, e.g., the geometry of the robot. However, such interpreters or compilers are usually contained in modern robot controls, because these permit the evaluation of complex mathematical expressions in the context of their programming language. It is thus possible to perform, e.g., the backward calculation of a three-axis kinematics, i.e., the determination of the angle of rotation from two cartesian position coordinates x, y by the evaluation of the arc (arc) tangent function (arctan).

Both Variant 1 and Variant 2 can be combined with any desired model description (ASCII data file, connection graphics of the mechanical components, . . . ).

While specific embodiments of the invention have been shown and described in detail to illustrate the application of the principles of the invention, it will be understood that the invention may be embodied otherwise without departing from such principles.

What is claimed is:

1. A method for controlling a robotic device, comprising the steps of:
    electronically storing a plurality of control algorithms in a first memory, that each contain control code that operates a robotic device by causing components of the robotic device, articulated with respect to each other at respective axes, to execute respective motions dependent on said control code;
    electronically storing a plurality of model modules in a second memory, separate from said first memory, that each contain an exclusively mathematical model of a kinematic structure of said robotic device that mathematically represents at least said motions and said axes, and that contains no control code, and that must be transformed in order to be used by the respective control algorithms in order to operate said robotic device;
    through an interface of a control unit of said robotic device, accessing at least one of said model modules from said second memory for current use in operating said robotic device as a pre-setting for said robotic device;
    in a computerized checking module, automatically checking compatibility of said presetting with said control algorithms by determining at least whether said pre-setting can be transformed for use by said control algorithms; and
    when said checking module indicates that said presetting is compatible, automatically operating said robotic device from said control unit to execute at least some of said control algorithms with said pre-setting.

2. A method as claimed in claim 1 comprising incorporating said computerized checking module in each of said model modules.

3. A method as claimed in claim 1 comprising incorporating said computerized checking module in said interface.

4. A method as claimed in claim 1 comprising, when said checking module indicates that said pre-setting is compatible, embedding said pre-setting in the control code of said at least some of said control algorithms.

5. A robotic device comprising:
    a first memory in which a plurality of control algorithms are stored, that each contain control code that operates a robotic device by causing components of the robotic device, articulated with respect to each other at respective axes, to execute respective motions dependent on said control code;
    a second memory in which a plurality of model modules are stored, said second memory being separate from said first memory, each of said model modules containing an exclusively mathematical model of a kinematic structure of said robotic device that mathematically represents at least said motions and said axes, and that contains no control code, and that must be transformed in order to be used by the respective control algorithms in order to operate said robotic device;
    a control unit;
    an interface of the control unit configured to access at least one of said model modules from said second memory, in response to a manual input, for current use in operating said robotic device as a pre-setting for said robotic device;
    computerized checking module configured to automatically check compatibility of said presetting with said control algorithms by determining at least whether said pre-setting can be transformed for use by said control algorithms; and
    said control unit being configured, when said checking module indicates that said presetting is compatible, to automatically operate said robotic device to execute at least some of said control algorithms with said pre-setting.

6. A robotic device as claimed in claim 1 wherein said computerized checking module is integrated in each of said model modules.

7. A robotic device as claimed in claim 1 wherein said computerized checking module is integrated in said interface.

8. A robotic device as claimed in claim 1 wherein said control unit, when said checking module indicates that said pre-setting is compatible, is configured to embed said pre-setting in the control code of said at least some of said control algorithms.

* * * * *